3,744,969
BREAK RESISTANT LEATHER
Hugo A. Alps and William C. Prentiss, Huntingdon Valley, Pa., assignors to Rohm & Haas Company, Philadelphia, Pa.
No Drawing. Filed June 9, 1970, Ser. No. 44,880
Int. Cl. C14c 3/22, 11/00
U.S. Cl. 8—94.21                     14 Claims

ABSTRACT OF THE DISCLOSURE

Mineral-tanned leather can be provided with improved break properties and improved dyeing characteristics by the impregnation thereof with certain novel polyampholyte resins.

---

This invention relates to a method for treating leather to provide the leather with improved break and excellent dyeing characteristics.

Acid and direct dyes have attained universal trade acceptance for the dyeing of leather. A straight mineral-tanned stock and, particularly, a straight chrome-tanned stock is readily dyed by the anionic (acidic and direct) dyes. The anionic dyes exhibit high affinity for the chromium nucleus of the chrome salts used for tanning and substantially all of the dye is absorbed on the surface with little or no penetration into the leather substrate. Such a dyeing characteristic is quite desirable since it provides maximum efficiency of dye usage and permits obtaining of the deepest possible shades. Thus, the dye costs are minimized since dye is not lost through penetration of the dye into the interior of the leather substrate.

While mineral-tanned leathers have many desirable characteristics, retanning is the general rule in order to permit the introduction into the leather of other desirable properties possible with other tanning agents.

Typically, polymeric tanning compositions which may be used for retanning mineral-tanned leathers include polymers containing acid units which cause the polymeric substances to permeate and adhere to the corium minor and to penetrate and adhere to a substantial portion of the corium major. Such retanning agents are introduced for the purpose of improving leather break and improved resistance to scuffing. In general, these polymers are formed by polymerization of polymerizable monoethylenically unsaturated acid monomers, such as acrylic acid and/or methacrylic acid, with other suitable polymerizable materials, such as saturated monohydric aliphatic esters of acrylic or methacrylic acid or vinyl esters of fatty acids (as described in U.S. 3,103,447) or with sulfate unsaturated oils (as described in U.S. 3,408,319). These retanning treatments improve the leather characteristics and substantially improve the break properties of the mineral-tanned stock.

The use of such polymers containing acid groups has, however, presented a new problem. The ability to obtain deep shades of dyeing, characteristic of the mineral-tanned stock, is very substantially reduced and/or eliminated. It has been found that, unlike the case with mineral-tanned stock wherein very little penetration of the dye into the leather substrate was obtained, the acid-polymer retanned leather is readily penetrated by acid and direct dyes thereby significantly increasing dye costs and preventing the obtaining of deep shades and in some instances of uniform dyeing.

Examination of the leather suggests that the carboxylic acid groups of the retanning polymer mask, chelate, or otherwise complex the mineral salt of the initial tanning agent, thereby reducing the number of cationic sites in the leather to a degreee that the leather, in the vicinity of the retanning polymer, becomes nonionic or even anionic, depending on the extent of penetration of the retanning material. The acidic or direct dyes which are anionic in character encounter few or no surface sites suitable for dye adsorption and, thus, penetrate more deeply into the leather where the coloring value is ineffectual. It was thought that the substitution of basic polymers for the acidic polymers in the polymeric retanning agent might resolve the problem. Tests conducted along this line bore out this hypothesis. However, the good break characteristics and scuff resistance, the principal reasons for utilizing the retanning polymer, were not obtained. The break characteristics were not significantly different from the straight-chrome stock and the dyeing characteristics, while significantly better than for the acid-polymer retanned stock, were not as good as for the straight-chrome stock.

It has now been found that certain polyampholyte resins may be utilized to great advantage for the retanning of mineral-tanned leather to provide a retanned leather possessing both excellent dyeability and excellent break. For the purpose of this invention, the term "mineral-tanned stock" is intended to embrace leather stocks which have been tanned with mineral salts, such as basic chromium sulfate ("chrome"), alum, basic zirconium sulfate and the like, which are known to the art as possessing tanning properties. The term "polyampholyte resin" is intended to embrace those polymeric materials which contain both acidic and basic groups pendent along the polymer chain and which are generally formed by addition polymerization of a mixture of acid and basic monomers (U.S. Pat. No. 2,138,763) or by hydrolyzing copolymers capable of producing basic and acidic groups on hydrolysis (U.S. Pat. No. 2,592,107); the term is not intended to encompass condensation polymers or the polymers wherein the acidic and/or basic functionality is in the polymer backbone, or polymers wherein the acidic and/or basic groups are present only as terminal groups.

The polyampholyte resins useful for the purposes of the present invention are characterized as follows:

(a) the predominant acidic groups are carboxy (—COOH) groups;
(b) the predominant basic groups are amino nitrogen groups;
(c) the polymer backbone is essentially a carbon backbone; and
(d) an aqueous solution having an isoelectric "point" in the range of 2.5 pH to 4.5 pH can be prepared from the polymer.

In describing the "predominant" acid and basic groups, it is specifically contemplated that minor amounts of other acidic and basic groups may also be present without significantly changing the essential nature of the present invention. For the purposes of the present invention "amino nitrogen groups" are defined as one or more of the following: primary amino, secondary amino, tertiary amino, quaternary ammonium and the heterocyclic nitrogen capable of forming a salt with a mineral acid (e.g., pyridine or piperidine type groups).

The polymer backbone is of the type characteristic of addition polymerization of acrylic, vinyl or ethylenically unsaturated monomers, i.e., an essentially linear carbon backbone.

The isoelectric "point" of an aqueous solution of the polyampholyte resin is determined by visual observation of solution turbidity. On either side of the isoelectric point, the solution is essentially clear. In referring to the isoelectric "point," it is to be understood that in most instances it will not, in fact, be a single point but will be a range, e.g., 2.8 to 4.8. For such a solution, at pH 2 or 5, the solution will appear clear; as the pH is changed into the range 2.8 to 4.8, turbidity will become apparent. The useful polyampholyte resins for the purposes of the present invention are considered as having an isoelectric "point" in the range of 2.5 pH to 4.5 pH when the actual isoelectric range of the aqueous solution of the polymer for the most part overlaps one end or the other of the above pH range or is totally encompassed within it. Thus, e.g., as will be seen in the subsequent examples, a polyampholyte resin exhibiting an isoelectric "point" of from about 2.75 to 4.0 and a polyampholyte resin exhibiting an isoelectric "point" in the range of 3.45 to 5.35 are both useful for the purposes of the present invention.

Accordingly, for the purposes of the present invention polyampholyte resins having the above-described characteristics are prepared by interpolymerization of monoethylenically unsaturated acid monomers with monoethylenically unsaturated basic monomers, with or without neutral monomers, such that the polyampholyte polymer comprises 2.5 to 45 mol percent of basic monomer and from about 97.5 mol percent down to $(55-x)$ mol percent of the acid monomer and from 0 to $x$ mol percent of a neutral monomer, that the amount of neutral monomer shall not exceed the smaller of 20 mol percent and twice the mol percent of basic monomer. In the preferred composition, the basic monomer ranges from 3.5 mol percent to 35 mol percent and the acid monomer ranges from 96.5 mol percent to $(65-x)$ mol percent wherein $x$ is as defined previously.

The present invention will be illustrated by the preferred embodiment: the retanning of chrome-tanned stock with an aqueous solution of a copolymer of methacrylic acid (MAA) and dimethylaminoethylmethacrylate hydrochloride (DMAEMA·HCl). It is to be understood, however, that it is not so limited but is broadly applicable to the retanning of all mineral-tanned stocks utilizing any of the polyampholyte resins having the characteristics described previously herein.

EXAMPLE I

For the purposes of this test, the material treated was a chrome-tanned leather having a surface pH of 5.75 and an inside (cut) pH of 5.0. The polyampholyte resin utilized consisted of an aqueous solution (25.3% solids) of a 90% MAA/10% DMAEMA·HCl copolymer exhibiting (at 10% concentration) a pH of 2.4.

A sample of the chrome-tanned leather was impregnated with 5 percent (blue shaved weight basis) of the polyampholyte and evaluated statistically for break characteristics against control samples. The polyampholyte retanned, chrome-tanned leather showed a highly significant improvement over the corresponding test in which the polyampholyte was omitted. The tanning and retanning agents were applied in the same manner in the tests as such agents are normally utilized in the art, the conditions being essentially the same throughout the tests; the pH was adjusted to the range of 3 to 4 prior to application of the polyampholyte.

EXAMPLE II

In a series of tests the use of a "neutral" monomer in the formulation of the polyampholyte resin system was studied. The solids concentration was also varied. The neutral monomers utilized were methyl methacrylate (MMA) and ethyl acrylate (EA). The several compositional variations are set forth in Table II, wherein the numbers represent weight percents of each of the monomers in the final polyampholyte resin.

TABLE I

| Monomers | Ratio | Solids, percent |
|---|---|---|
| MAA/MMA/DMAEMA:HCl | 75/15/10 | 25 |
| MAA/MMA/DMAEMA:HCl | 75/15/10 | 40 |
| MAA/MMA/DMAEMA:HCl | 70/17.5/12.5 | 25 |
| MAA/MMA/DMAEMA:HCl | 70/17.5/12.5 | 40 |
| MAA/EA/DMAEMA:HCl | 75/15/10 | 25 |
| MAA/EA/DMAEMA:HCl | 75/15/10 | 40 |
| MAA/EA/DMAEMA:HCl | 70/17.5/12.5 | 24 |
| MAA/EA/DMAEMA:HCl | 70/17.5/12.5 | 39 |
| MAA/MMA/DMAEMA:HCl | 68.5/17.5/14 | 39 |
| MAA/MMA/DMAEMA:HCl | 73/15/12 | 39 |

The stock utilized was a chrome-tanned stock having a pH of 3.75. Prior to application of the polyampholyte resin, the pH of the leather was raised to 4.75 with sodium formate. In each instance the polyampholyte resin was applied to the stock at a 5% solids level. In addition to the foregoing, a sample treated with straight polymethacrylic acid (PMAA) was also tested. Finally, as a final control the straight-chrome stock was subjected to various tests for comparison purposes. The testing unequivocally established a very significant improvement in break properties for those test samples treated with the polyampholyte as compared to the straight-chrome stock and the PMAA-treated stock. There was some indication that the use of ethyl acrylate as a neutral copolymer was generally preferable to the use of methyl methacrylate insofar as break properties are concerned. With regard to color, the depth of color was not significantly different from the chrome control for those stocks treated with a polyampholyte containing 73% or less methacrylic acid. Those samples containing an excess of 73% of methacrylic acid had more satisfactory dyeing characteristics than the polymethacrylic acid control but were not as good as those containing lesser amounts of methacrylic acid.

EXAMPLE III

Additional variations in composition were studied in which various monomers were polymerized with methacrylic acid and dimethylaminoethylmethacrylate hydrochloride. In addition to those identified in Examples I and II, the following monomers were utilized: methyl acrylate (MA); butyl acrylate (BA); hydroxyethyl methacrylate (HEMA); hydroxypropyl methacrylate (HPMA); acrylic acid (AA); methacryloxypropionic acid (MOPA); ethyl methacrylate (EMA); itaconic acid (IA); and butyl methacrylate (BMA). For simplicity, in Table II dimethylaminoethylmethacrylate hydrochloride is abbreviated as "D." The samples tested are summarized in Table II.

TABLE II

| Composition | Ratio | Viscosity (cps.) | Total solids | Tans | pH (10% sol.) | Iso-electric range |
|---|---|---|---|---|---|---|
| MAA/EA/D | 75/15/10 | 28,400 | 39.9 | 36.1 | 2.3 | 2.4–4.65 |
| MAA/MMA/D | 75/15/10 | 167 | 25.3 | 23.3 | 2.5 | 2.7–4.6 |
| MAA/EA/D | 70/17.5/12.5 | 21,150 | 38.7 | 33.6 | 2.5 | 2.5–4.75 |
| MAA/MMA/D | 70/17.5/12.5 | 114 | 25.2 | 21.3 | 2.3 | 2.25–4.4 |
| MAA/EA/D | 65/20/15 | 121 | 24.8 | 20.9 | 2.6 | 2.4–4.9 |
| MAA/MA/D | 75/15/10 | 60 | 25.1 | 22.9 | 2.6 | 2.8–4.7 |
| MAA/AA/EA/D | 65/10/15/10 | 77 | 25.0 | 23.2 | 2.3 | (a) |
| MAA/HPMA/D | 75/15/10 | 3 | 25.3 | 23.2 | 2.3 | 2.6–4.3 |
| MAA/HEMA/D | 75/15/10 | 38 | 25.0 | 22.7 | 2.3 | 2.7–4.3 |
| MAA/MOPA/D | 75/15/10 | 23 | 25.2 | 23.5 | 2.4 | 2.5–4.0 |
| MAA/EMA/D | 77.5/10/12.5 | 52 | 25.2 | 22.5 | 2.4 | 2.3–4.3 |
| MAA/IA/EA/D | 70/5/15/10 | 75 | 24.8 | 22.4 | 2.4 | 2.1–4.2 |
| MAA/EA/D | 70/17.5/12.5 | 101 | 25.4 | 21.9 | 2.5 | 2.0–4.2 |
| MAA/EA/D | 75/15/10 | 175 | 25.3 | 23.0 | 2.5 | 2.1–4.1 |
| MAA/BMA/D | 80/7.5/12.5 | 46 | 25.0 | 22.9 | 2.5 | (a) |
| MAA/BA/D | 77.5/10/12.5 | 114 | 25.0 | 23.0 | 2.3 | (a) | a Not determined.

On the basis of these tests, it is once again observed that all samples exhibited better break characteristics than the unretanned chrome leather controls. Additionally, it showed that any of the polymers applied at a higher solids level is superior in break characteristics to the same polymer composition made at lower solids. The control sample treated with PMAA rated very low on break characteristics.

With regard to dye characteristics, the unretanned chrome leather controls were the best, but most of the polyampholyte treated samples were close, and the PMAA treated samples were among the worst. Additionally, it was generally noted that the samples below 75% in MAA were significantly superior to those containing 75% or more MAA.

EXAMPLE IV

In the foregoing, the amino component utilized was dimethylaminoethylmethacrylate hydrochloride. The effectiveness of other amino monomers is also useful. Thus, the dimethylaminoethylmethacrylate hydrochloride can be replaced by: 2 hydroxy, 3-methacryloxypropyl trimethyl ammonium chloride (G=Mav); t-butylaminoethylmethacrylate HCl (t-BAEMA HCl); 4-vinyl pyridine HCl (4–VP HCl). In each instance, the polymers utilized were 90% MAA/10% amino monomer. The compositions tested are shown in Table III.

TABLE III

| Composition | Percent solids | Percent tans | Percent purity | pH (10%) | Viscosity (cps.) |
|---|---|---|---|---|---|
| MAA/DMAEMA HCl | 24.9 | 24.5 | 98 | 1.95 | 32,500 |
| MAA/t-BAEMA HCl | 25.4 | 20.4 | 80 | 1.95 | 26,500 |
| MAA/4-VP HCl | 23.2 | 22.7 | 98 | 1.90 | 8,250 |
| MAA/G-Mac | 25.2 | 24.8 | 98 | 2.20 | 5,230 |

The results were compared to a commercial retanning agent consisting essentially of a copolymer of 80% methacrylic acid/20% of an unsaturated oil (34% solids, 28% tans, pH of 2.65 at 10%) as well as to the plain chrome-tanned stock control. Each of the polymeric compositions gives break characteristics characteristic of the polyampholyte treatments. With regard to dyeing characteristics, the DMAEMA·HCl treating agent still provides the best dyeing characteristic with the stock at a pH of about 4.65; with the G-Mac a close second. At lower pH tests (2.35), the t-BAEMA·HCl was superior. In general, however, best results were obtained at the higher stock pH levels.

EXAMPLE V

To illustrate the effective application level on break and dye resistance a MAA/EA/DMAEMA·HCl (75/15/10) polyampholyte resin (23.5% solids) was applied to chrome stock at tan concentration levels of 5.0%, 2.5%, 1.25%, 0.625%, and 0.3125%. The resulting retan product showed a definite increase in desirable break characteristics as the tan concentration of the treated stock increased. At all concentrations, the break characteristics were better than for a polymethacrylic acid-treated control (5.0% tan concentration). It was found that about 2.5% was the minimum concentration to impart leather break significantly better than the straight-chrome leather. This precise value will, of course, vary depending on the specific polyampholyte used for treating the leather, but indicates that break characteristics can be improved at the higher levels.

The tan level appeared to have a reverse effect on the dye characteristics. While the polyampholyte treatment was superior in dye receptivity to the PMAA control, at all levels, the dye receptivity decreased as the tan concentration increased.

EXAMPLE VI

The effect of molecular weight, as indicated by viscosity, can be illustrated by a series of tests conducted with a MAA/EA/DMAEMA·HCl (75/15/10). The viscosity ranged on the samples from about 1200 cps. to about 37,000 cps. (estimated at 25% solids). Insofar as break characteristics are concerned, molecular weight did not seem to produce any difference of significance and all of the polyampholytes were superior to polymethacrylic acid as a treating agent. Dye receptivity definitely, however, increased with increasing molecular weight. The PMAA control was inferior in dye receptivity to all of the polyampholytes irrespective of molecular weight.

As a result of tests of the type discussed above, the preferred practice for the purposes of the present invention comprises use of an aqueous polyampholyte polymer solution of high solids content with a polymer of high molecular weight. However, the maximum solids content generally decreases with increasing polymer molecular weight. In such cases, it is preferred to use a lower molecular weight polymer in order to obtain the higher solids content in the aqueous solution. Thus, while as shown in the data, a solids content in excess of 15% is useful, the solids content should generally be at least 25% and preferably about 35%. At the higher solids contents, therefore, a low molecular weight polymer, e.g., one having a viscosity below about 4000 cps., and preferably below 2000 cps. (measured at 25% solids), should be used. Further, where a polymer containing inert monomers is utilized, e.g., a terpolymer, the methacrylic acid content should preferably be below 75%.

The preferred polymer system is prepared from:

(a) at least one acidic monomer of the group: methacrylic acid, acrylic acid, methacryloxypropionic acid, and itaconic acid, preferably predominantly methacrylic acid, and (b) at least one basic monomer of the group: lower alkylaminoethylmethacrylates, e.g., dimethylaminoethylmethacrylate and t-butylaminoethylmethacrylate; methacryloxyquaternary ammonium compounds, e.g., 2-hydroxy, 3 methacryloxypropyl trimethyl ammonium chloride; and vinyl pyridines, e.g., 4-vinyl pyridine.

When inert monomers are employed, the preferred inert monomers are methyl methacrylate and ethyl acrylate in amounts not exceeding about 15%.

To assist in the selection of the preferred polyampholyte resins, a series of polymers were prepared at different acid-basic monomer ratios and the isoelectric range measured. The resins were titrated with N/10 NaOH at 1% resin solids level, and the beginning and disappearance of turbidity during titration were visually observed. The results are summarized below.

| MAA/DMAEMA·HCl ratio: | Isoelectric pH range |
|---|---|
| 90/10 | 2.75–4.0 |
| 80/20 | 2.55–5.0 |
| 70/30 | 3.00–5.25 |
| 60/40 | 3.45–5.35 |
| 50/50 | 4.20–5.55 |

What is claimed is:

1. In the process of treating leather with chemicals to improve its characteristics for ultimate use wherein the leather is subjected to mineral tanning, the improvement which comprises retanning the mineral-tanned stock with an aqueous solution of a polyampholyte resin consisting essentially of a polymer having an essentially carbon backbone having pendent therefrom carboxy groups and amino nitrogen groups in a mol ratio of from about 97.5:2.5 to about 35:45, said resin characterized as capable of forming an aqueous solution having an isoelectric point in the range of 2.5 pH to 4.5 ph.

2. A process in accordance with claim 1 wherein said polyampholyte resin consists essentially of a polymer of from 2.5 to 45 mol percent of monoethylenically unsaturated basic monomer, from about 97.5 mol percent to (55−$x$) mol percent of monoethylenically unsaturated acid monomer and up to $x$ mol percent of monoethylenically unsaturated neutral monomer with the proviso that $x$ shall not exceed the smaller of 20 mol percent and twice the mol percent of basic monomer, said polyampholyte resin having an isoelectric point in the range of 2.5 pH to 4.5 pH.

3. A process in accordance with claim 2 wherein said basic monomer is at least one member of the group consisting of lower alkylaminoethylmethacrylates, methacryloxy quaternary ammonium compounds and vinyl pyridines, said acid monomer is at least one member of the group consisting of methacrylic acid, acrylic acid, methacryloxypropionic acid and itaconic acid, and said neutral monomer is at least one member of the group consisting of lower alkyl and hydroxy lower alkyl acrylates and methacrylates.

4. A process in accordance with claim 3 wherein $x$ is essentially zero, said basic monomer is dimethylaminoethylmethacrylate and said acid monomer is at least predominantly methacrylic acid.

5. A process in accordance with claim 3 wherein $x$ is at least 10 but not greater than 15, and said inert monomer is methyl methacrylate, ethyl acrylate or mixtures thereof.

6. In the process of treating leather with chemicals to improve its characteristics for ultimate use wherein the leather is subjected to mineral tanning, the improvement which comprises retaining the mineral-tanned stock with an aqueous solution of a polyampholyte resin consisting essentially of a polymer of from 3.5 to 35 mol percent of monoethylenically unsaturated basic monomer, from about 96.5 mol percent to (65−$x$) mol percent of monoethylenically unsaturated acid monomer and up to $x$ mol percent of monoethylenically unsaturated neutral monomer with the proviso that $x$ shall not exceed the smaller of 20 mol percent and twice the mol percent of basic monomer, said polyampholyte resin having an isoelectric point in the range of 2.5 pH to 4.5 pH.

7. A process in accordance with claim 6 wherein said basic monomer is at least one member of the group consisting of lower alkylaminoethylmethacrylates, methacryloxy quaternary ammonium compounds and vinyl pyridines, said acid monomer is at least one member of the group consisting of methacrylic acid, acrylic acid, methacryloxypropionic acid and itaconic acid, and said neutral monomer is at least one member of the group consisting of lower alkyl and hydroxy lower alkyl acrylates and methacrylates.

8. A process in accordance with claim 7 wherein $x$ is essentially zero, said basic monomer is dimethylaminoethylmethacrylate and said acid monomer is at least predominantly methacrylic acid.

9. A process in accordance with claim 7 wherein $x$ is at least 10 but not greater than 15, and said inert monomer is methyl methacrylate, ethyl acrylate or mixtures thereof.

10. As an article of manufacture, mineral-tanned leather impregnated with a polymer having an essentially carbon backbone having pendent therefrom carboxy groups and amino nitrogen groups in a mol ratio of from about 97.5:2.5 to about 35:45, said polymer characterized as capable of forming an aqueous solution having an isoelectric point in the range of 2.5 pH to 4.5 pH.

11. An article in accordance with claim 10 wherein said polymer consists essentially of from 2.5 to 45 mol percent of monoethylenically unsaturated basic monomer, from about 97.5 mol percent to (55−$x$) mol percent of monoethylenically unsaturated acid monomer and up to $x$ mol percent of monoethylenically unsaturated neutral monomer with the proviso that $x$ shall not exceed the smaller of 20 mol percent and twice the mol percent of basic monomer, said polymer having an isoelectric point in the range of 2.5 pH to 4.5 pH.

12. An article in accordance with claim 11 wherein said basic monomer is at least one member of the group consisting of lower alkyl and hydroxy lower alkyl acrylates acryloxy quaternary ammonium compounds and vinyl pyridines, said acid monomer is at least one member of the group consisting of methacrylic acid, acrylic acid, methacryloxypropionic acid and itaconic acid, and said neutral monomer is at least one member of the group consisting of lower alkyl and hydroxy lower alkyl acrylates and methacrylates.

13. An article in accordance with claim 12 wherein $x$ is essentially zero, said basic monomer is dimethylaminoethylmethacrylate and said acid monomer is at least predominantly methacrylic acid.

14. An article in accordance with claim 12 wherein $x$ is at least 10 but not greater than 15, and said inert monomer is methyl methacrylate, ethyl acrylate or mixtures thereof.

References Cited
UNITED STATES PATENTS

| | | | |
|---|---|---|---|
| 3,269,859 | 8/1966 | Mattei et al. | 117—142 |
| 3,083,118 | 3/1963 | Bridgeford | 117—142 X |
| 3,317,476 | 5/1967 | Sellet | 260—72 |
| 3,441,365 | 4/1969 | Lowell | 8—94.21 |
| 3,345,203 | 10/1967 | Kine | 117—76 |

ROLAND E. MARTIN, JR., Primary Examiner

U.S. Cl. X.R.

117—142